US011575495B2

(12) United States Patent
Dror et al.

(10) Patent No.: US 11,575,495 B2
(45) Date of Patent: Feb. 7, 2023

(54) ONE-STEP TIMESTAMPING IN NETWORK DEVICES

(71) Applicant: Marvell Israel (M.I.S.L) Ltd., Yokneam (IL)

(72) Inventors: Nitzan Dror, Ramot Hashavim (IL); Lenin Patra, Dublin, CA (US); Jeng-Jong Chen, Santa Clara, CA (US)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 134 days.

(21) Appl. No.: 17/210,347

(22) Filed: Mar. 23, 2021

(65) Prior Publication Data

US 2021/0297230 A1 Sep. 23, 2021

Related U.S. Application Data

(60) Provisional application No. 62/993,524, filed on Mar. 23, 2020.

(51) Int. Cl.
*H04L 7/00* (2006.01)

(52) U.S. Cl.
CPC .................. *H04L 7/0016* (2013.01)

(58) Field of Classification Search
CPC ........................................... H04L 7/0016
See application file for complete search history.

(56) References Cited

U.S. PATENT DOCUMENTS

| 8,948,037 | B1 | 2/2015 | Mizrahi |
| 9,172,485 | B2 | 10/2015 | Mizrahi |
| 9,407,733 | B1 | 8/2016 | Mizrahi |
| 9,806,835 | B2 | 10/2017 | Mizrahi |

(Continued)

FOREIGN PATENT DOCUMENTS

| EP | 2254267 A1 | 11/2010 |
| WO | WO-2001/088746 A1 | 11/2001 |

(Continued)

OTHER PUBLICATIONS

Abdul, et al., "Integration of HSR and IEEE1588 over Ethernet networks," Proc. of the 2010 Int'l IEEE Symposium on Precision Clock Synchronization for Measurement, Control and Communication, pp. 77-82 (Sep. 27-Oct. 1, 2010).

(Continued)

*Primary Examiner* — Elton Williams

(57) ABSTRACT

A media access control (MAC) processor of a network device receives a timing packet to be transmitted by the network device. The MAC processor generates one or more indicators to be used by a PHY device of the network device for embedding timing information into the timing packet. The one or more indicators include at least an indicator indicating that the timing packet is a type of packet into which timing information is to be embedded, an indicator of a location of a field in the timing packet at which the timing information is to be embedded, and an indicator of whether timing information in the timing packet needs to be updated. The MAC processor transfers the timing packet and the one or more indicators to the PHY device for further processing of the timing packet and subsequent transmission of the timing packet from the network device.

19 Claims, 6 Drawing Sheets

(56) References Cited

U.S. PATENT DOCUMENTS

| | | | |
|---|---|---|---|
| 2002/0021717 A1* | 2/2002 | Hedayat | H04L 69/32 370/512 |
| 2008/0273521 A1* | 11/2008 | Shao | H04W 56/0065 370/350 |
| 2009/0310572 A1 | 12/2009 | Wang et al. | |
| 2010/0223399 A1* | 9/2010 | Kim | H04J 3/0667 709/248 |
| 2017/0111483 A1 | 4/2017 | Wang et al. | |
| 2020/0252320 A1 | 8/2020 | Zemach et al. | |

FOREIGN PATENT DOCUMENTS

| | | |
|---|---|---|
| WO | WO-2011/0108870 A2 | 9/2011 |
| WO | WO-2012/065823 A1 | 5/2012 |

OTHER PUBLICATIONS

Abstract of IEEE 802.1AS Standard, "802.1AS—Timing and Synchronization," *The Institute of Electrical and Electronics Engineers, Inc.*, available at http://www.ieee802.org/1/pages/802.1as.html, 1 page (Mar. 30, 2011).

Aldana et al., IEEE P802.11—Wireless LANs, "CIDs 46,47,48 Regarding Fine Timing Measurement," *The Institute of Electrical and Electronics Engineers, Inc.*, doc.: IEEE 802.11 11-12-1249-04-000m, pp. 1-17 (Jan. 2013).

Alizadeh et al., "DCTCP: Efficient packet transport for the commoditized data center," SIGCOMM, pp. 1-15(2010).

Appenzeller et al., "Sizing router buffers," SIGCOMM, pp. 1-15 (2004).

Chin et al., "IEEE 1588 Clock Synchronization using Dual Slave Clocks in a Slave," IEEE Communications Letters, vol. 13, No. 6, pp. 456-458 (Jun. 2009).

Corlett et al. "Statistics of One• Way Internet Packet Delays", Internet Engineering Task Force, available at http://tools.ietf.org/id/draft-corlett-statistics-of-packet-delays-00.txt, pp. 1-9 (Aug. 2002).

Gurewitz et al., "Estimating One-Way Delays from Cyclic-Path Delay Measurements," Proc. of Twentieth Annual Joint Conf. of the IEEE Computer and Comm. Societies (IEEE Infocom 2001), vol. 2, pp. 1038-1044 (2001).

Gurewitz et al., "One-Way Delay Estimation Using Network Wide Measurements," IEEE Trans. on Information Theory, vol. 52, No. 6, pp. 2710-2724 (2006).

IEEE P1588™ D2.2 "Draft Standard for a Precision Clock Synchronization Protocol for Networked Measurement and Control Systems," *The Institute of Electrical and Electronics Engineers, Inc.*, 2008.

IEEE P802.1 AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-196 (Oct. 2004).

IEEE Std. 1588™-2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).

IEEE Std. C37.238™-2011, "IEEE Standard Profile for Use of IEEE 1588™ Precision Time Protocol in Power System Applications," *Institute for Electrical and Electronics Engineers, Inc.*, pp. 1-66 (Jul. 2011).

ITU-T Recommendation G.8265.1/Y.1365.1, "Precision time protocol telecom profile for frequency synchronization," *Int'l Telecommunication Union*, pp. 1-28 (Oct. 2010).

IEC 62439-3, "Industrial communication networks—High availability automation networks—Part 3: Parallel Redundancy Protocol (PRP) and High-availability Seamless Redundancy (HSR)," *International Electrotechnical Commission*, pp. 1-62 (2010).

Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

Mills et al., "Network Time Protocol Version 4: Protocol and Algorithms Specification," Request for Comments: 5905, *Internet Engineering Task Force (IETF)*, pp. 1-111 (Jun. 2010).

Mills, "Internet Time Synchronization: The Network Time Protocol," Network Working Group Request for Comments, No. 1129, pp. 1-29 (Oct. 1989).

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS), pp. 1-6 (Sep. 24, 2012).

Mukherjee, "On the Dynamics and Significance of Low Frequency Components of Internet Load," Internetworking: Research and Experience, vol. 5, No. 4. pp. 163-205 (1992).

Paxson, "End-to-End Internet Packet Dynamics," IEEE/ACM Transactions on Networking, vol. 7(3), pp. 277-292 (Jun. 23, 1997).

Shpiner et al., "Multi-Path Time Synchronization," Internet Engineering Task Force (IETF), pp. 1-15 (Oct. 15, 2012).

Simanic et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24 (2011).

Weber et al., "High availability seamless automation ring (Draft IEC 62439-3) and IEEE 1588 time sync dependencies," *Institute for Electrical and Electronics Engineers, Inc*, pp. 1-7 (Oct. 2010).

Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140 (Sep. 27-Oct. 1, 2010).

Zhang et al., "PDV-based PTP LSP Setup, Reoptimization and Recovery," Internet Engineering Task Force, pp. 1-17 (Oct. 2011).

International Search Report and Written Opinion in International Patent Application No. PCT/US2021/023777, dated Jul. 2, 2021 (15 pages).

\* cited by examiner

| Reserved 402 | CF Offset 404 | TAI Domain selection 406 | Checksum Update Indicator 408 | Timestamp LSB 410 |

ONE-STEP TIMESTAMPING IN NETWORK DEVICES

CROSS REFERENCES TO RELATED APPLICATIONS

This application claims the benefit of U.S. Provisional Patent App. No. 62/993,524, entitled "1 Step PTP Time-Stamping Over USXGMII/USGMII Interfaces," filed on Mar. 23, 2020, the disclosure of which is hereby expressly incorporated herein by reference in its entirety.

FIELD OF TECHNOLOGY

The present disclosure relates generally to communication networks, and more particularly to timestamping packets in a network device.

BACKGROUND

Clock synchronization protocols are commonly used in packet-based networks to synchronize clocks maintained at different network devices. In such clock synchronization protocols, a first network device, which maintains a master clock, transmits a timing packet including a transmit timestamp generated based on a master clock time to a second network device, which maintains a slave clock. The second network device utilizes the transmit timestamp of the timing packet and an estimated network latency to adjust the slave clock in order to synchronize the slave clock with the master clock. In two-step timestamping scenarios, a timestamp corresponding to transmission time of a timing packet is transmitted in a follow-up packet. Because the timestamp corresponding to a timing packet is transmitted in a follow-up packet, two-step timestamping systems do not require "on-the fly" hardware embedding of the timestamp into packet. However, two-step timestamping requires transmission of additional packets, which increases overhead and, in at least some scenarios, impacts throughput of the network. Also, two-step timestamping requires the follow-up packet to be matched with a corresponding timing packet at the second network device, which increases implementation complexity and sometimes leads to synchronization errors when matching is performed incorrectly.

Some systems utilize one-step timestamping mechanisms in which a timestamp corresponding to transmission time of a timing packet is embedded into the timing packet, on-the-fly, as the packet is transmitted from the network device. One-step timestamping eliminates some inefficiencies and complexities associated with two-step timestamping, but one-step timestamping typically increases hardware requirements, cost and power consumption of physical layer modules in network devices because a network device typically needs to perform parsing and timing computation operations with respect to packets at wire speed in order to embed timestamps or other timing information into timing packets on-the-fly as the timing packets are transmitted from the network device.

SUMMARY

In an embodiment, a method for processing timing packets for synchronizing network devices in a network device comprises: receiving, at a media access control (MAC) processor of the network device, a timing packet to be transmitted by the network device; performing initial processing of the timing packet by the MAC processor, including generating one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and transferring i) the timing packet and ii) the one or more indicators from the MAC processor to the PHY device for further processing of the timing packet based on the one or more indicators and subsequent transmission of the timing packet from the network device.

In another embodiment, a network device configured to operate in a network comprises a media access control (MAC) processor configured to: receive a timing packet to be transmitted by the network device; generate one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and transfer i) the timing packet and ii) the one or more indicators to the PHY device for further processing of the timing packet based on the one or more indicators and subsequent transmission of the timing packet from the network device.

In yet another embodiment, a network device configured to operate in a network comprises a media access control (MAC) processor coupled to a physical layer (PHY) device, wherein the MAC processor is configured to: receive a timing packet to be transmitted by the network device; generate one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and transfer i) the timing packet and ii) the one or more indicators to the PHY device. The PHY device is configured to: receive i) the timing packet from the MAC processor and ii) the one or more indicators from the MAC processor; embed, based on the one or more indicators, timing information into the timing packet; and forward the timing packet to one or more network ports of the network device for transmission of the timing packet from the network device.

In still another embodiment, a method for embedding timing information into timing packets to be transmitted by a network device comprises: receiving, at a physical layer (PHY) device of the network device, a timing packet to be transmitted by the network device, the timing packet including initial timing information provided by one or both of i) a medium access control (MAC) processor and ii) a host processor of the network device; receiving, at the PHY device from the MAC processor, one or more indicators of one or more parameters to be used by the PHY device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; updating, by the PHY device based on the one or more indicators, the initial timing information in the timing packet to embed final timing information into the timing packet; and forwarding, by the PHY device, the timing packet to one or more network ports of the network device for transmission of the timing packet from the network device.

In yet another embodiment, a network device configured to operate in a network comprises a physical layer (PHY) device processor configured to: receive a timing packet to be transmitted by the network device, the timing packet including initial timing information provided by one or both of i) a medium access control (MAC) processor and ii) a host processor of the network device; receive one or more indicators of one or more parameters to be used by the PHY device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; update, based on the one or more indicators, the initial timing information in the timing packet to embed final timing information into the timing packet; and forwarding the timing packet to one or more network ports of the network device for transmission of the timing packet from the network device.

BRIEF DESCRIPTION OF THE DRAWINGS

FIG. 4 is a diagram of a physical layer (PHY) tag included in the control header of FIG. 3B, according to an embodiment.

DETAILED DESCRIPTION

Figure 1:
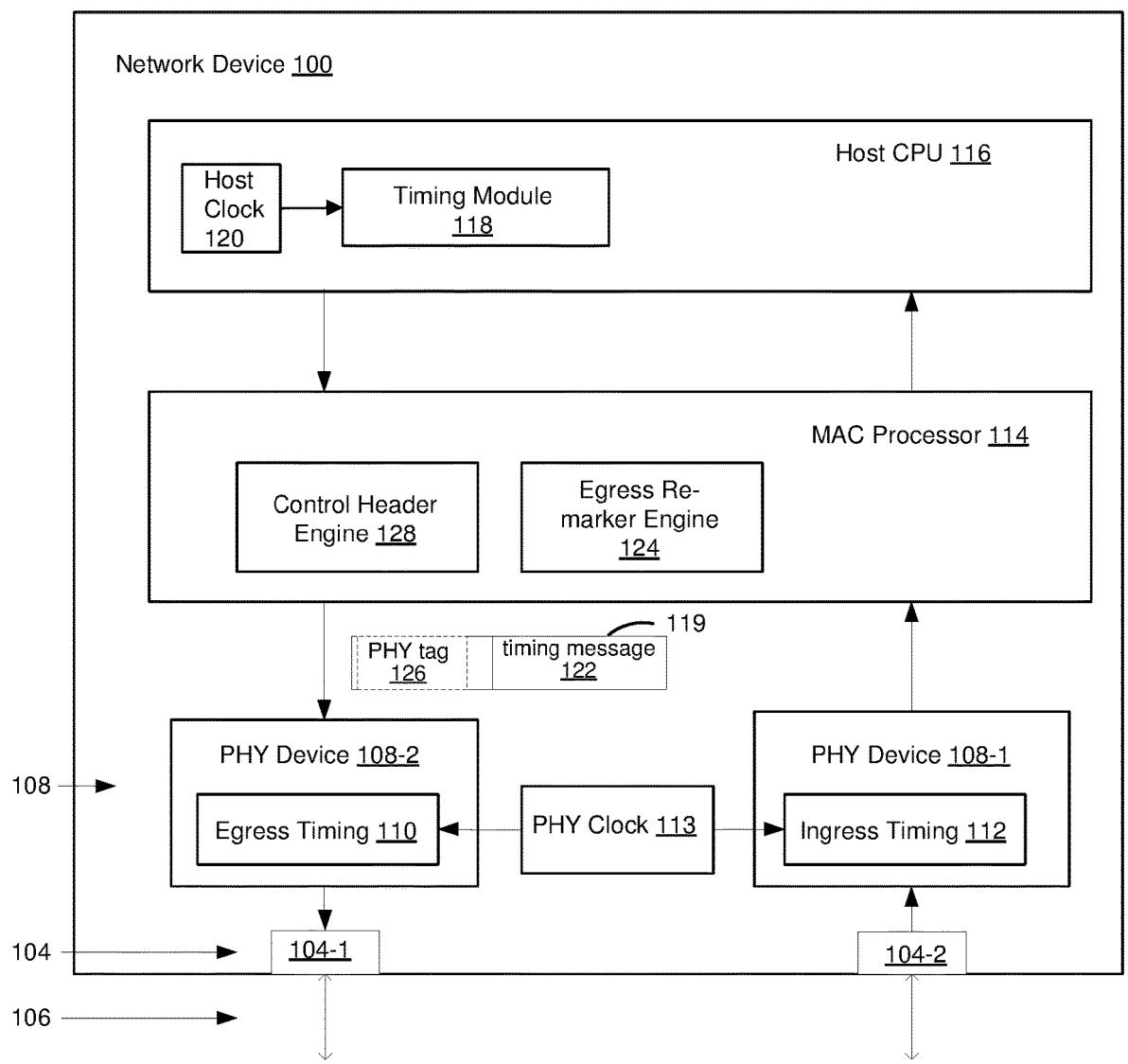
FIG. 1 is a block diagram of an example network device configured to generate and/or update timing packets to allow one or more other devices in a network to synchronize with a master clock in the network, according to an embodiment.

In embodiments described below, a network device includes a physical layer (PHY) processor configured to implement one-step timestamping of timing packets by embedding timing information corresponding to timing packets on-the-fly as the timing packets are transmitted from the network device. In an embodiment, one or more higher-layer processors, such a medium access control (MAC) processor and/or a host processor, of the network device are configured to perform a portion of operations associated with embedding a timestamp into a packet, such as to embed initial timing information into the timing packet, and to provide one or more tags containing relevant information to the PHY device to enable the PHY device to efficiently embed final timing information into the timing packet on the-fly as the timing packet is transmitted from the network device. For example, in an embodiment, the host processor of the network device is configured to set a timestamp field and a correction field in a timing packet to indicate an initial time corresponding to a time of transmission of the timing packet from the network device. As another example, the MAC processor of the network device is configured to update a correction field in a timing packet to set the correction field to an initial value corresponding to a residence time of the timing packet in the network device.

In an embodiment, the MAC processor is configured to, when transferring a timing packet to the PHY device, also provide one or more indicators of one or more parameters to be used by the PHY device for embedding timing information into the timing packet. In an embodiment, the one or more indicators or tags indicate to the PHY device at least i) that the timing packet is a type of packet into which timing information is to be embedded by the PHY device, ii) a location of a field in the timing packet at which the timing information is to be embedded into the timing packet by the PHY device, and iii) whether timing information in the timing packet needs to be updated by the PHY device. As a more specific example, in an embodiment, the MAC processor is configured to provide to the PHY device an indicator of a location of the correction field in the timing packet. As another example, the MAC processor is configured to provide to the PHY device an indicator of whether a checksum trailer field in the timing packet needs to be updated by the PHY device, in an embodiment. The PHY device is configured to utilize the one or more indicators provided by the MAC processor to embed the timing information into the timing packet. For example, the PHY device is configured to utilize the one or more indicators to quickly locate and update the correction field in the timing packet to reflect an accurate time of transmission of the timing packet from the network device or an accurate residence time of the timing packet in the network device, to determine whether an update to a checksum trailer field is needed and, if so, quickly update the checksum trailer field, etc.

Performing initial processing and timestamping of a timing packet at a MAC and/or host processor of the network device and providing relevant information for final embedding of timing information into the timing packet to the PHY device of the network device enables the PHY device to efficiently and accurately embed the timing information into the timing packet on-the-fly as the packet is transmitted from the network device leverages hardware and/or processing power of the MAC and/or host processor, that may be necessary for performing general MAC and/or host processing operations by the MAC and/or host processor, to perform operations associated with timestamping packets and facilitates a reduction in reduced hardware, and accordingly reduced power consumption, cost, etc. of the PHY device that performs one-step type time stamping in which time stamping information is embedded into an outgoing packet, as compared to systems in which a PHY device is configured to perform on-the-fly embedding of timing information into timing packets without relevant information being provided from a MAC processor and/or without initial timing information being embedded into the timing packets by the MAC processor and/or by a host processor, in various embodiments.

FIG. 1 is a block diagram of an example network device 100 configured to transmit timestamped packets in a network to allow one or more other devices to synchronize with a master clock in the network, according to an embodiment. The network device 100 is configured to operate according to a synchronization protocol for timing synchronization. In an embodiment, the network device 100 is configured to operate according to the Institute of Electrical and Electronics Engineers (IEEE) 1588 standard, commonly referred to as the "Precision Time Protocol" or "PTP." In another embodiment, the network device 100 is configured to operate according to another synchronization protocol, such as the network time protocol (NTP) or another suitable synchronization protocol. The network device 100 is configured to implement one-step timestamping, in an embodiment. In this embodiment, the network device 100 is configured to embed timing information corresponding to a transmission time of a timing packet directly into the timing packet, on-the-fly, as the timing packet is transmitted from the network device 100.

The network device 100 is configured to operate as an ordinary clock device that implements a master clock or a slave clock on the network, a boundary clock device that synchronizes with a master clock and relays the master clock to one or more slave devices on the network, or a transparent clock that is an intermediate device configured to relay system residence time from a master to one or more salve devices on the network, in various embodiments. Generally, the network device 100 is configured to generate timing packets and/or update timing information in received timing packets, and transmit the timing packets to the one or more other devices on the network to allow the one or more other devices to synchronize with the master clock on the network, in various embodiments. As used herein, the term "timing packets" refers to network data packets that include timing messages generated and transmitted by network devices in a network and used for conducting time related procedures in the network, such as clock synchronization between network devices in the network.

The network device 100 includes one or more network ports 104 configured to couple to respective one or more network links 106 for coupling the network device 100 to one or more other devices in a network. The network device 100 also includes one or more physical layer (PHY) processors 108 coupled to the one or more network ports 104, in an embodiment. Although the network device 100 is illustrated in FIG. 1 as having a respective PHY device 108 coupled to a respective network port 104, the network device 100 includes a PHY device 108 that is coupled to multiple (e.g., all) network ports 104, in some embodiments. In another embodiment, the network device 100 is a single port device that includes only a single PHY device 108 coupled to a single port 104. The one or more PHY devices 108 are sometimes referred to herein as "the PHY device 108" for brevity.

In various embodiments, the PHY device 108 includes one of, or any suitable combination of two or more of, a digital-to-analog converter (DAC), an amplifier, a modulator, etc. (not shown), to covert a digital signal corresponding to a packet to an analog signal suitable for transmission via the communication link 106. The PHY device 108 also includes one or more timing modules configured to implement timing synchronization operations. For example, a PHY device 108-1 includes an egress timing module 110, and a PHY device 108-2 includes an ingress timing module 112, in an embodiment. The egress timing module 110 of the PHY device 108-1 is configured to embed, into timing packets, timing information based on a clock maintained by a PHY clock 113, the timing information corresponding to transmission time of the timing packets from the network device 100, in an embodiment. The ingress timing module 112 of the PHY device 108-2 is configured to generate timestamps for received timing packets based on the clock maintained by the PHY clock 113, the timestamps corresponding to receipt time of timing packets by the network device 100, in an embodiment. In another embodiment, the PHY device 108-1 and the PHY device 108-2 are independent entities that maintain respective PHY clocks 113. In some such embodiment, a suitable clock synchronization mechanism is employed to synchronize the respective PHY clocks 113.

The egress timing module 110 and the ingress timing module 112 are implemented in hardware configured to perform on-the-fly operations at wire speed, in an embodiment. For example, in an embodiment, the egress timing module 110 of the PHY device 108-1 is configured to embed timing information corresponding to transmission time of a packet on-the-fly as the packet is transmitted from the network device 100. The ingress timing module 112 is configured to generate a timestamp for a packet on-the-fly as the packet is received by the network device 100, in an embodiment. Although the PHY device 108-1 is illustrated in FIG. 1 as including an egress timing module, and the PHY device 108-2 is illustrated in FIG. 1 as including an ingress timing module, a PHY device 108 includes both an egress timing module configured to embed timing information into packets transmitted from the network device 100 and an ingress timing module configured to generate timestamps for packets received by the network device 100, in an embodiment.

The network device 100 also includes a media access control (MAC) processor 114 and a host processor 116, in an embodiment. The MAC processor 114 is implemented using one more integrated circuits (e.g., one or more application-specific integrated circuits (ASICs)), in an embodiment. In an embodiment, the host processor 116 is, or is implemented by, a processing unit, such as a central processing unit (CPU) of the network device 100. In an embodiment, the host processor 116 is configured to implement computer readable instructions stored in a memory (not shown) of the network device 100. The MAC processor 114 is coupled to the one or more PHY devices 108 and the host processor 116. The MAC processor is configured to receive packets from the one or more PHY devices 108, to perform MAC operations with respect to the packet received from the one or more PHY devices 108, e.g., to parse and de-capsulate the packets, and to transfer the packets to the host processor 116 for further processing, in an embodiment. The MAC processor 114 is also configured to receive packets from the host processor 116, to perform MAC operations with respect to the packet received from the host processor 116, e.g., to encapsulate the packets with one or more protocol headers, and to transfer the packets to appropriate one or more PHY devices 108 for transmission from the network device 100, in an embodiment. As will be discussed in more detail below, the MAC processor 114 is configured to perform initial processing of timing packets and to provide, to a PHY device (e.g., the PHY device 108-2), one or more indicators or tags containing relevant information for updating initial timing information in a timing packet by the PHY device, in various embodiments.

In an embodiment and/or scenario in which the network device 100 is operating as an ordinary clock device or a boundary clock device, the host processor 116 is configured to generate timing packets originating from the network device 100. In an embodiment, the network device 100 includes or implements a timing module 118 configured to generate timing packets for transmission from the network device 100. In an embodiment, the timing module 118 is configured to generate timing packets to include initial timing information indicative of transmission time of the timing packets. The initial timing information is determined based on a host clock 120 maintained by the host processor 116, in an embodiment. In an embodiment, the timing module 118 is configured to set a timestamp field in a timing packet generated by the timing module 118 to a current value of a host clock 120 maintained by the host processor 116. The timing module 118 is further configured to set a correction field in the timing packet to an initial correction value for compensating the current value of the host clock 120 for transmission delay expected to be experienced by the timing packet between the current time and the time that the timing packet is actually transmitted from the network device 100. The host processor is configured to transfer the timing packet to the MAC processor 114, The MAC processor 114 is configured to, in turn transfer, the timing packet to an appropriate PHY device 108 for transmission of the packet from a network port 104 of the network device 100.

The host clock 120 used by the host processor 116 to generate the initial timing information for a timing packet is less accurate than the PHY clock 113, in an embodiment. For example, the host clock 120 maintains a time of day with an accuracy within one or several milliseconds, whereas the PHY clock 113 maintains a time of day with an accuracy within one or several nanoseconds, in an embodiment. As will be explained in more detail below, the correction field of the timing packet is subsequently updated by an egress timing module in a PHY device 108 based on the PHY clock 113 at the time of transmission of the timing packet from the network device 100. Updating the correction field by the PHY device 108 based on the PHY clock 113 compensates for inaccuracy of the host clock 120, in at least some embodiments.

With continued reference to FIG. 1, in an embodiment and/or a scenario in which the network device 100 is operating as a transparent clock device, a PHY device 108 is configured to receive a timing packet received by the network device 100 via a first network ports 104, timestamp the timing packet with ingress time of the timing packet, and transfer the timing packet, along with the timestamp, to the MAC processor 114. The MAC processor 114 is configured to process the timing packet, to locate a correction field with the timing packet, and to update the correction field in the timing packet to reflect residence time of the timing packet in the network device 100. The MAC processor 114 is configured to then transfer the timing packet to an appropriate PHY device 108 for transmission of the timing packet from a second network port 104 of the network device 100.

Referring still to FIG. 1, the MAC processor 114 is illustrated as transferring a timing packet 119 to the PHY device 108-2. The timing packet 119 is an Ethernet packet, such as, for example, as a User Datagram Protocol (UDP) over internet protocol version six (IPv6) packet, in an embodiment. In another embodiment, the timing packet 119 is another suitable type of packet, such as a UDP over internet protocol version six (IPv4) or a datalink (L2) layer protocol packet. The timing packet 119 includes a timing message 122. The timing message 122 is a PTP message, such as a PTP synchronization (Sync) message or a PTP delay request message, in an embodiment. The timing message 122 is another suitable type of timing message, in other embodiments. The timing packet 119 is a timing packet generated by the timing module 118 of the host processor 116, in an embodiment. In another embodiment, the timing module 116 generates the timing message 122 and the MAC processor 114 encapsulates the timing message 122 with one or more protocol headers, tags, etc., to generate the timing packet 119. In another embodiment, the timing packet 119 is a timing packet received by the MAC processor 114 from a PHY device 108.

Figure 2:
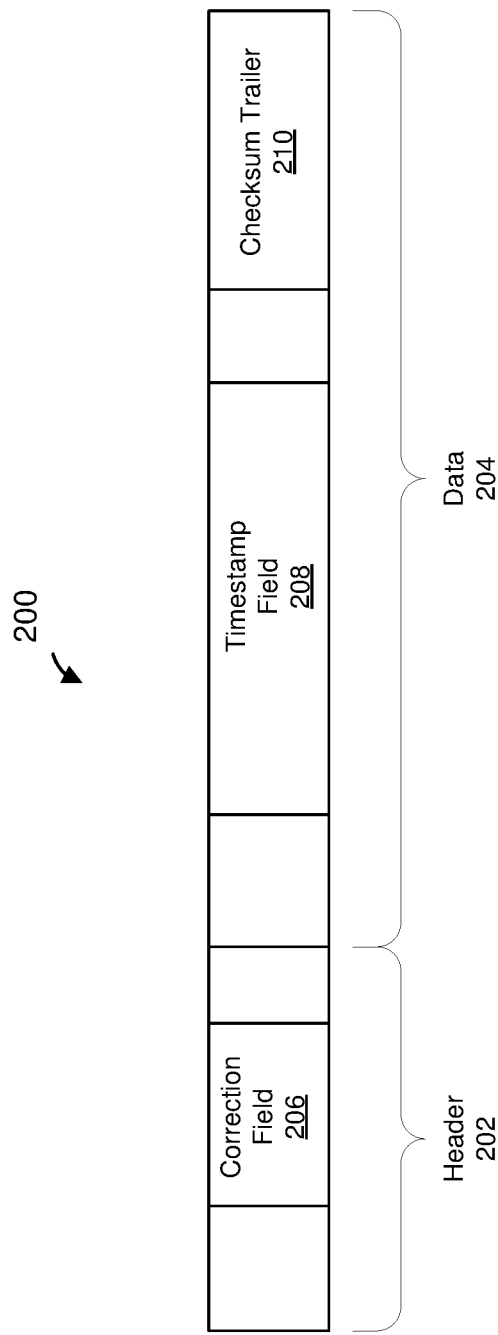
FIG. 2 is a diagram of a timing packet generated and/or updated by the network device of FIG. 1, according to an embodiment.

Referring briefly to FIG. 2, an example timing message 200 corresponds to the timing message 122, in an embodiment. The timing message 122 is different from the timing message 200, in another embodiment. The timing message 200 includes a header 202 and a data portion 204. The header 202 includes a correction field 206, in an embodiment. The header field 202 includes one or more other fields in addition to the correction field 206, in some embodiments. The data portion 204 includes a timestamp field 208. In some embodiments, the data portion 204 includes one or more fields in addition to the timestamp field 208. For example, the data portion 204 includes a checksum trailer field 210, such as a UDP trailer field or another type of checksum trailer field. The data portion 204 omits the checksum trailer field, in some embodiments.

Referring now FIGS. 1 and 2, in an embodiment in which the timing message 122 is generated by the host processor 116, such as in an embodiment in which the network device 100 is operating as an ordinary clock or a boundary clock device, the timing module 118 of the host processor 116 sets the timestamp field 208 of the timing message 122 to a current value of the host clock 120, in an embodiment. The timing module 118 also selectively generates a correction field value for the timing message 122, and sets the correction field 206 of the timing message 122 to the generated correction field value. In an embodiment, the timing module 118 generates the correction field value to be equal to the negative value of the nanosecond portion of the timestamp in the timestamp field 208 so that the nanosecond portion of the timestamp can be subsequently updated by a PHY device 108, based on the PHY clock 113, at a time of transmission of the timing packet 119 from the network device 100. In an embodiment, the timing module 118 also adds an egress pipeline delay to the correction field value, where the egress pipeline delay is a preconfigured value of static delay from a point which the PHY device 108 timestamps a timing packet to an egress pin of the PHY device 108 via which the timing packet is egressed from the PHY device 108. In an embodiment, of the timing message 122 includes a checksum trailer field such as the checksum trailer field 210, the timing module 118 is sets the checksum trailer field 210 of the timing packet 119 based on the values of the timestamp field 208 and the correction field 206, to maintain correctness of a checksum, such as a UDP checksum, in the timing packet 119.

Referring still to FIGS. 1 and 2, in an embodiment the timing packet 119 is a timing packet received by a PHY device 108 (e.g., the PHY device 108-1) from a network port 104 (e.g., the network port 104-1). In an embodiment, when the timing packet 119 is received by the network device 100, the ingress timing module 112 of the PHY device 108-1 generates a timestamp for the timing packet 119, the timestamp corresponding to a time of receipt, or an ingress time, of the timing packet 119 by the network device 100. The PHY device 108-1 then transfers the timing packet 119, along with the timestamp generated for the timing packet 119, to the MAC processor 114. In an embodiment, the PHY device 108-1 generates a control header for the timing packet 119, embeds the timestamp into the control header, and transfers the timing packet 119 with the control header to the MAC processor 114. In an embodiment, the PHY device 108-1 replaces, with the control header generated for the timing packet 119, a preamble of the timing packet 119, and transfers the timing packet with the control header to the MAC processor 114. In other embodiments, the PHY device 108-1 transfers the timestamp generated for the timing packet 119 to the MAC processor 114 in other suitable manners.

In an embodiment, the MAC processor 114 includes an egress re-marker engine 124 configured to process timing packets received by the MAC processor 114 from a PHY device 108 (e.g., the PHY device 108-1) to locate and update correction fields in timing messages included in the timing packets to indicate residence times of the timing packets in the network device 100. In an embodiment, the egress re-marker engine 124 is configured to process the timing packet 119 received from the PHY device 108-1, and to locate and update the correction field 206 of the timing message 122 in the timing packet 119 to indicate a residence time of the timing packet 119 in the network device 100. In an embodiment, the egress re-marker engine 124 is configured to update the correction field 206 of the timing message 122 by subtracting the ingress time of the timing packet 119, indicated by the timestamp generated for the timing packet 119, from the current correction value of the correction field 206. In an embodiment, the egress re-marker engine 124 is configured to also add an egress pipeline delay to the correction field value of the correction field 206, where the egress pipeline delay is a preconfigured value of static delay from a point which the PHY device 108 timestamps a timing packet to an egress pin of the PHY device 108 via which the timing packet is egressed from the PHY device 108.

With continued reference to FIG. 1, the MAC processor 114 is configured to transfer the timing packet 119 to an appropriate PHY device 108 (e.g., the PHY device 108-2) for transmission of the timing packet 119 from a network port 104 (e.g., the network port 104-2). In an embodiment, the MAC processor 114 is configured to also provide to the PHY device 108-2, one or more indicators of one or more parameters to enable the PHY device 108-2 quickly and efficiently embed timing information into the timing packet 119. The one or more parameters provided by the MAC processor 114 to the PHY device 108-2 enable the PHY device 108-2 to determine that the timing packet 119 requires timing information update, and to quickly locate the field in the timing packet 119 in which to embed the timing information update, without performing classification and/or parsing of the timing packet 119, in an embodiment. In an embodiment, the one or more indicators or tags indicate to the PHY device at least i) that the timing packet is a type of packet into which timing information is to be embedded by the PHY device, ii) a location of a field in the timing packet at which the timing information is to be embedded into the timing packet by the PHY device, and iii) whether timing information in the timing packet needs to be updated by the PHY device. In some embodiments the MAC processor 114 provides to the PHY device 108-2 one or more additional indicators to facilitate timing information update by the PHY device 108-2. As an example, the one or more indicators provided by the MAC processor 114 to the PHY device 108-2 include one or more of i) an indicator of a location of the correction field 206 in the timing message 122 in the timing packet 119 to enable the PHY device 108-2 to locate and update the correction field 206 without parsing the timing packet 119 to determine the location of the correction field 206 in the timing packet 119, ii) an indicator of whether a checksum trailer field (e.g., the checksum trailer field 210) is present in the timing message 122 in the timing packet 119 iii) and indicator of time application interface (TAI) domain to be used for embedding timing information into the timing packet 119, and iv) an indicator of whether wraparound needs to be accounted for in connection with embedding the timing information into the timing packet 119. In other embodiments, other suitable indicators are additionally or alternatively provided by the MAC processor 114 to the PHY device 108-2 to enable the PHY device 108-2 to efficiently embed timing information into the timing packet 119 on-the-fly as the timing packet 119 is transmitted from the network device 100.

In an embodiment, the MAC processor 114 is configured to include the one or more indicators of the one or more parameters in control header generated for the timing packet 119, the control header including a PHY tag 126, and to insert the control header into the timing packet 119. The MAC processor 114 includes a control header engine 128 configured to generate a control header for the timing packet 119 (e.g., in an embodiment in which the timing packet 119 is a timing packet originated by the network device 100) or is configured to modify a control header already present in the timing packet 119 (e.g., in an embodiment in which the timing packet 119 is a timing packet received by the MAC processor 114 from a PHY device 108 of the network device 100). In an embodiment in which the timing packet 119 is received by the MAC processor 114 from the host processor 116, the control header engine 128 is configured to generate a control header for the timing packet 119, and embed the PHY tag 126 into the control header generated for the timing packet 119. In an embodiment, the PHY tag 126 is configured for the timing packet 119 by the host processor 116 when the host processor 116 generates the timing packet 119. In an embodiment in which the timing packet 119 is received by the MAC processor 114 from a PHY device 108 (e.g., the PHY device 108-1), the control header engine 120 is configured to generate the PHY tag 128 for the timing packet 119 and insert the PHY tag 128 into a control header generated for the timing packet 119 by the PHY device 108. Example control headers generated for the timing packet 119 by the PHY device 108 or the MAC processor 114, in various embodiments, are described in more detail below with reference to FIGS. 3A-3B. An example PHY tag inserted into a control header of the timing packet 119, according to an embodiment, is described in more detail below with reference to FIG. 4.

Referring still to FIG. 1, the PHY device 108-2 is configured to receive the timing packet 119 from the MAC processor 114, and to embed timing information into the timing packet 119 based on the one or more indicators provided to the PHY device 108-2 by the MAC processor 114. In an embodiment, the egress timing module 110 of the PHY device 108-2 is configured to embed timing information into the timing packet 119. In an embodiment, because initial timing information is already embedded to the timing packet 119 by the MAC processor 114 or the host processor 118, the PHY device 108 needs to merely update relevant timing information in the timing packet 119 to indicate the actual transmission time of the timing packet 119 from the network device 100 or residence time of the timing packet 119 in the network device 100. For example, in an embodiment, the egress timing module 110 is configured to update the correction field vale in the timing message 122 in the timing packet 119 to add to the correction value a current value (e.g., a current nanosecond value) of the PHY clock 113.

In an embodiment, the egress timing module 110 is configured to embed the timing information into the timing packet 119 based on the one or more indicators provided to the PHY device 108-2 by the MAC processor 114. For example, the egress timing module 110 is configured to update the correction value of the correction field 206 at the location determined by the PHY device 108-2 based on an indicator of the location of the correction field provided by the MAC processor 114 (e.g. included in the PHY tag 126). As another example, the PHY device 108-2 is configured to determine, based on an indicator provided by the MAC processor 114, whether a checksum trailer field (e.g., the checksum trailer field 210) is present in the timing packet 119 and needs to be updated by the PHY device 108-2 and, in so, update the checksum trailer field in the timing packet 119, in an embodiment.

Embedding final timing information into the packet 119 by updating timing information already included in the timing packet 119, as performed by the PHY device 108-1, is less computationally intensive compared to systems that do not embed initial timing information into timing packets by a higher-level processor, such as a MAC processor or a host processor. Also, because relevant indicators for embedding the timing information into the timing packet 119 are provided to the PHY device 108-2 by the MAC processor 114, the PHY device 108-2 need not parse the timing packet 119, for example to determine a location of the correction field 206 in the timing message 122 in the timing packet 119 and/or to determine whether a checksum trailer field is present in the timing message 122 in the timing packet 119 and needs to be updated by the PHY device 108-2, in various embodiments. The PHY device 108-2 is therefore implemented with reduced hardware, which reduces power consumption, cost, etc., as compared to systems in which a PHY device is configured to perform on-the-fly one-step time-stamping without indicators being provided by a MAC processor and/or without initial timing information being embedded into the timing packets by the MAC processor or by a host processor, in at least some embodiments.

Referring still to FIG. 1, it is noted that although the network device 100 is illustrated in FIG. 1 as including a PHY device 108-1 coupled to a network port 104-1 and a PHY device 108-2 coupled to the network port 104-2, the network device 100 omits one or both of the PHY device 108-1 and the PHY device 108-1 and/or 108-2, in some embodiments. For example, the MAC processor 114 is coupled directly to one or both of the network port 104-1 and/or the network port 104-2, in some embodiments. In an embodiment in which the MAC processor 114 is coupled directly to the network port 104-1, the MAC processor 114 generates an ingress timestamp for a timing packet received by the MAC processor 114 from the network port 104-1. Further, in an embodiment in which the network device the MAC processor 114 is coupled directly to the network port 104-2, the MAC processor 114 updates timing information in a timing packet prior to forwarding the timing packet to the network port 104-2 for transmission of the timing packet. For example, the MAC processor 114 updates a correction field in the timing packet based on a MAC clock (not shown) maintained by the MAC processor 114 to indicate a transmission time or the timing packet from the network device 100 or to add a residence time of the timing packet in the network device 100, in various embodiments.

Figure 3A:
FIGS. 3A-B are diagrams of a control header inserted into the timing packet of FIG. 2, according to various embodiments.

Turning now to FIG. 3A, a control header 300 is generated for a timing packet by a PHY device 108 (e.g., the PHY device 108-1), according to an embodiment. In an embodiment, the control header 300 generally conforms to a known control header format specified for a media independent interface, such as the Universal Serial 10GE Media Independent Interface (USXGMII) or the Universal Serial Gigabit Media Independent Interface (USGMII). However, the control header 300 is modified with respect to known control header format specified for a media independent interface, in an embodiment. The control header 300 includes a packet type field 302, a SubPort Identifier (Id) field 304, and extension field type indicator field 306, an extension field 308 and a cyclic redundancy check (CRC) field 310, in the illustrated embodiment. In some embodiments, the control header 300 omits one or more of the fields 302-310 illustrated in FIG. 3A and/or includes one or more additional fields not illustrated in FIG. 3A.

In an embodiment, a PHY device (e.g., the PHY device 108-1) is configured to generate the control header 300 for a received timing packet, and to insert the control header at a predetermined location within the timing packet. For example, the PHY device 108-1 is configured to replace, with the control header 300, a preamble at a beginning of the timing packet. The PHY device 108-1 is configured to include, in the extension field 308 of the control header 300, a timestamp corresponding to a receipt time of the packet. The PHY device 108-1 is also configured to set the value of the extension field type field 306 to indicate that the extension field 308 includes a timestamp. In an embodiment, the timestamp included in the extension field 308 occupies 32 bits of the extension field 308. In another embodiment, the timestamp included in the extension field 308 occupies a number of bits different from 32 bits (e.g., 16 bits, 48 bits, 64 bits or any other suitable number of bits). In an embodiment, the PHY device 108-1 is configured to include the timestamp as a 32-bit unsigned value, in nanoseconds, of the PHY clock 113 at the time of receipt of the packet. In another embodiment, the PHY device 108-1 is configured to include the timestamp in another suitable format. For example, in an embodiment in which the PHY device 108-1 is configured to utilize an IEEE time application interface (TAI) format, the PHY device 108-1 is configured to convert a nanosecond value of the PHY clock 113 at the time of receipt of the packet into a 2-bit seconds value followed by a 29-bit nanoseconds value, which includes a two's compliment of the nanosecond value, in an embodiment.

The MAC processor 114 is configured to receive the timing packet, with the control header 300, from the PHY device 108-1, and to obtain the timestamp from the extension field 308 of the control header 300. In an embodiment, the MAC processor 114 is configured to pass the timestamp value, in a suitable format, to the host processor 116. In an embodiment, the MAC processor 114 is configured to convert the timestamp value to a format suitable for transfer to the host processor 116. For example, the MAC processor 114 is configured to in some embodiments, the MAC processor 114 is configured to modify the timestamp value, for example to subtract an ingress pipeline delay from the timestamp value, and to transfer the modified timestamp value to the host processor 116. In an embodiment, the MAC processor 114 is configured to generate a timestamp tag (TST) for the packet to include the timestamp value in the timestamp value, in the suitable format, and to pass the timestamp tag to the MAC processor 114 along with the packet. In an embodiment, the host processor 116 is configured to utilize the timestamp obtained from the control header 300 for synchronization with a master clock. In another embodiment, the MAC processor 114 is configured to internally utilize the timestamp obtained from the control header 300, for example to update a correction field in the timing packet 119 to reflect a residence time of the timing packet 119 as described above.

Figure 3B:

FIG. 3B is a diagram of a control header 350, according to an embodiment. Referring to FIG. 1, the MAC processor 114 is configured to insert the control header 350 into a timing packet received from the host processor 116 prior to transferring the packet to a PHY device (e.g., the PHY device 108-2) for transmission of the packet via a network port 104 (e.g., the network port 104-2, in an embodiment. In another embodiment, the MAC processor 114 is configured to modify a control header (e.g., the control header 300) already present in the timing packet to generate the control header 350. In an embodiment, the control header 350 is inserted into the timing packet at a predetermined location within the timing packet. For example, the control header 350 replaces a preamble at a beginning of the timing packet, in an embodiment.

The control header 350 is generally the same as the control header 300, accept that the extension field 308 of the control field 350 includes a PHY tag 314, in an embodiment. The PHY tag 314 corresponds to the PHY tag 126 of FIG. 1, in an embodiment. In an embodiment, the MAC processor 114 is configured to generate the PHY tag 314 for a timing packet received from the host processor 116, and include the PHY tag 314 in the extension field 308 of the control header 350 generated for the packet. In an embodiment, the MAC processor 114 is also configured to include, in the packet type field 302 of the control header 350, an indicator indicating that the timing packet is a type of packet into which timing information is to be embedded by the PHY device. The PHY device 108-2 is configured to determine, based on the packet type field 302, that the timing packet is a type of packet into which timing information is to be embedded by the PHY device, in an embodiment. The PHY device 108-2 is configured to perform embedding of timing information into the timing packet in response to determining, based on the packet type field 302, that the timing packet is a type of packet into which timing information is to be embedded by the PHY device, in an embodiment.

The MAC processor 114 is configured to generate the PHY tag 314 to include one or more indicators of one or more parameters needed by the PHY device 108-2 to embed timing information into the packet, the timing information indicating a time corresponding to transmission of the packet from the network device 100 or the residence time of the timing packet in the network device 100. In an embodiment, the MAC processor 114 is configured to insert the PHY tag 314 in place of a signature field of a control header format specified for the media independent interface.

In an embodiment, the PHY device 108-2 is configured to obtain, from the control header 350 and/or the PHY tag 314, one of more indicators for embedding timing information into the timing packet without parsing the timing packet to determine location of the control header 350 and/or the PHY tag 314 within the timing packet. For example, in an embodiment in which the control header 350 is inserted into the timing packet at a predetermined location within the timing packet, such as at a beginning of the timing packet, the PHY device 108-2 is configured to retrieve the one or more indicators from the control header 350 at the beginning of the timing packet and/or from the PHY tag 314 located at a predetermined location within the control header 350. As described above, the one or more indicators included in the control header 350 enable the PHY device 108-2 to efficiently apply one-step timestamping to the packet with reduced hardware requirements as compared to systems in which a PHY device implements one-step timestamping without receiving such one or more indicators from an upper layer processor such as a MAC processor, in at least some embodiments.

FIG. 4 is a diagram of a PHY tag 400, according to an embodiment. The PHY tag 400 corresponds to the PHY tag 314 of FIG. 3B, in an embodiment. The MAC processor 114 is configured to generate the PHY tag 400 for a timing packet received from the host processor 116 or for a timing packet received from a PHY device 108, in various embodiments. The PHY tag 400 includes a reserved field 402, a correction field offset field 404, a TAI domain selection field 406, a checksum update field 408 and a timestamp least significant bit (LSB) field 410, in the illustrated embodiment. In some embodiments, the PHY tag 400 omits one or more of the fields 402-410 illustrated in FIG. 4 and/or includes one or more additional fields not illustrated in FIG. 4.

The correction field offset field 404 of the PHY tag 400 is set to indicate a location of a correction field (e.g., the correction field 206 of FIG. 2) in the timing packet. For example, the correction field offset field 404 is set to an offset value (e.g., a number of bits, a number of bytes, or another suitable offset value) of beginning of the correction field from a beginning of the timing packet or from a beginning of a start frame delimiter (SFD) field in the timing packet, in an embodiment. In another embodiment, the correction field offset indicator field includes another suitable indicator of a location of the correction field in the timing packet. The TAI selection field 406 includes an indication of a TAI domain to be used by the PHY device 108-2 for timestamping the timing packet.

The checksum update indicator field 408 is set to indicate whether a checksum trailer field update it to be performed by the PHY device 108-2 for the timing packet. For example, if the timing packet is a UDP over IPv6 packet, then the MAC processor 114 sets the checksum update field 408 to a value (e.g., a logic 1) that indicates that the PHY device 108-2 is to update a checksum trailer field in the packet, in an embodiment. Otherwise, if the timing packet the timing packet is not a UDP over IPv6 packet, then the MAC processor 114 sets the checksum update indicator field 408 to a value (e.g., a logic 0) that indicates that no checksum trailer field update is needed, in an embodiment. The PHY device 108-2 determines, based on the checksum update indicator field 408, whether checksum trailer field update is needed and, in response to determining that the checksum trailer field update is needed, performs an incremental update of the checksum trailer field (e.g., the checksum trailer field 210 of FIG. 2) located at a predetermined location within a timing message in the timing packet, such as at an end of the timing message in the timing packet, in an embodiment.

The timestamp LSB field 410 includes the least significant bit of the timestamp in the timing packet, such as the ingress or origin timestamp in the timing packet, in an embodiment. The least significant bit of timestamp in the timing packet indicates to the PHY device 108-2 whether wraparound in the correction field of the timing packet needs to be accounted for by the PHY device 108-2, in an embodiment. In an embodiment, the PHY device 108-2 is configured to compare the least significant bit of the current value of the PHY clock 113 to the value of the timestamp LSB field 410. If the least significant bit of the current value of the PHY clock 113 is equal to the value of the timestamp LSB field 410, then the PHY device 108-2 determines no wraparound correction is needed, in an embodiment. In this case, the PHY device 108-2 (e.g., the egress timing module 110) determines a new value of the correction field in the timing packet by adding the nanosecond value of the PHY clock 113 to the current value of the correction field. On the other hand, in an embodiment, if the least significant bit of the current value of the PHY clock 113 is not equal to the value of the timestamp LSB field 410, then the PHY device 108-2 determines that wraparound has occurred. In this case the, the PHY device 108-2 (e.g., the egress timing module 110) determines a new value of the correction field in the timing packet by adding the nanosecond value of the PHY clock 113 and an extra second, or $10^9$ nanoseconds, to the current value of the correction field, in an embodiment.

Figure 5:
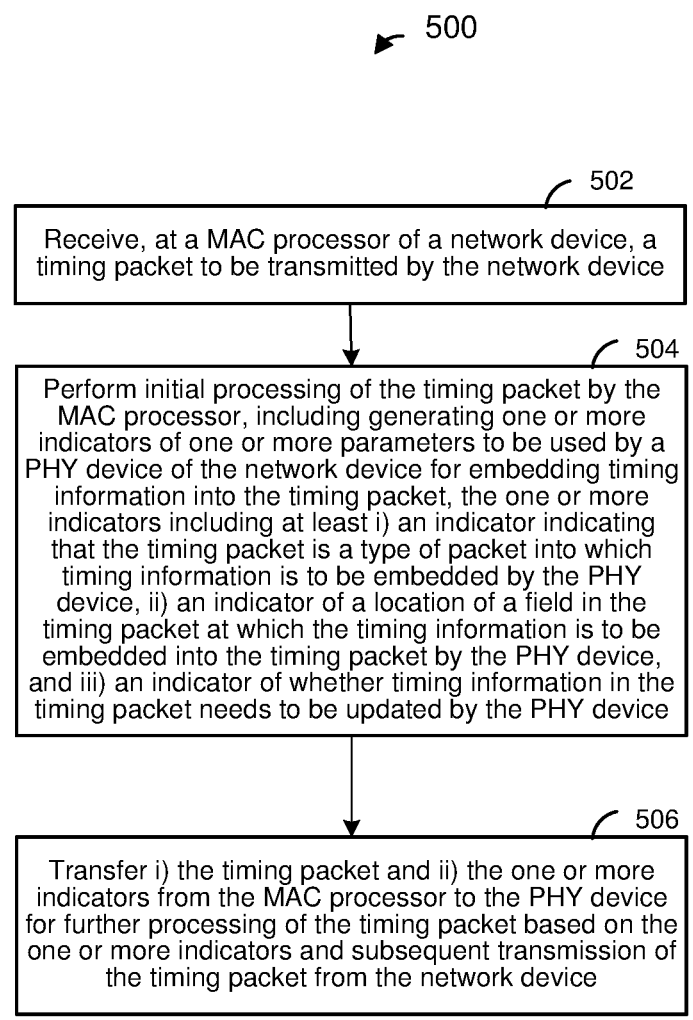
FIG. 5 is a flow diagram illustrating an example method for processing timing packets for synchronizing network devices in a network device, according to an embodiment.

FIG. 5 is a flow diagram illustrating an example method 500 for processing timing packets for synchronizing network devices in a network device, according to an embodiment. In an embodiment, the network device 100 of FIG. 1 implements the method 500. For example, in an embodiment, the MAC processor 114 of the network device 100 implements the method 500. For ease of explanation, the method 500 is described with reference to the network device 100 of FIG. 1. In other embodiments, the method 500 is implemented by other suitable network devices.

At block 502, a timing packet to be transmitted by a network device is received at a MAC processor of the network device. In an embodiment, the timing packet is received by the MAC processor 114 of FIG. 1. In an embodiment, the timing packet 119 of FIG. 1 is received by the MAC processor. In another embodiment, a timing packet different from the timing packet 119 of FIG. 1 is received by the MAC processor. In an embodiment in which the network device 100 is operating as an ordinary clock or a boundary clock device, the timing packet received at block 502 is a timing packet generated by the host processor 116. In an embodiment in which the network device 100 is operating as an transparent clock device, the timing packet received at block 502 is a timing packet received by the MAC processor from a network port of the network device, or from a PHY device coupled to the network port of the network device.

At block 504, the timing packet is processed by the MAC processor. In an embodiment, processing the timing packet by the MAC processor includes generating one or more indicators of one or more parameters to be used by the PHY device for embedding timing information into the timing packet provided from the MAC processor to the PHY device. In an embodiment, the one or more indicators enable the PHY device to efficiently embed timing information into the timing packet on-the-fly as the timing packet is transmitted from the network device. In an embodiment, the one or more indicators include at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device. As a more specific example, in an embodiment, the one or more indicators include an indicator of a location of a timing field in the timing packet to be updated by the PHY device, such a correction field in the timing packet, an indicator of whether a checksum trailer field is present in the timing packet, etc. In other embodiments, the one or more indicators additionally or alternatively include one or more other indicators of relevant information to enable the PHY device to efficiently embed timing information into the timing packet on-the-fly as the timing packet is transmitted from the network device.

At block 506, the timing packet and the one or more indicators are transferred from the MAC processor to the PHY device. In an embodiment, the MAC processor transfers the one or more indicators in the PHY device by including the one or more parameters in a control header (e.g., the control header 350 of FIG. 3B), and inserting the control header into the timing packet prior to transferring the timing packet to the PHY device. In an embodiment, control header 350 is inserted into the timing packet at a predetermined location within the timing packet. For example, the control header replaces a preamble at a beginning of the timing packet, in an embodiment. In other embodiment, the MAC processor provides the one or more indictors to the PHY device in other suitable manners, such as via control signals or one or more tags provided by the MAC processor to the PHY device separate from the timing packet being provided by the MAC processor to the PHY device.

In various embodiments, providing the one or more indicators from the MAC processor to the PHY device enables the PHY device to quickly and efficiently embed timing information into the packet, for example by updating an initial value of a timing field of the timing packet without parsing the timing packet to determine location of the correction field in the timing packet and/or to determine whether a checksum trailer field is present in the timing packet, in various embodiments. Thus, in at least some embodiments, providing the one or more indicators from the MAC processor to the PHY device facilities implementation of the PHY device with reduced hardware, which reduces power consumption, cost, etc., as compared to systems that in which a PHY device is configured to perform on-the-fly one-step timestamping without such indicators being provided from a MAC processor to the PHY device and/or without initial timing information being embedded into the timing packets by the MAC processor or by the host processor.

Figure 6:
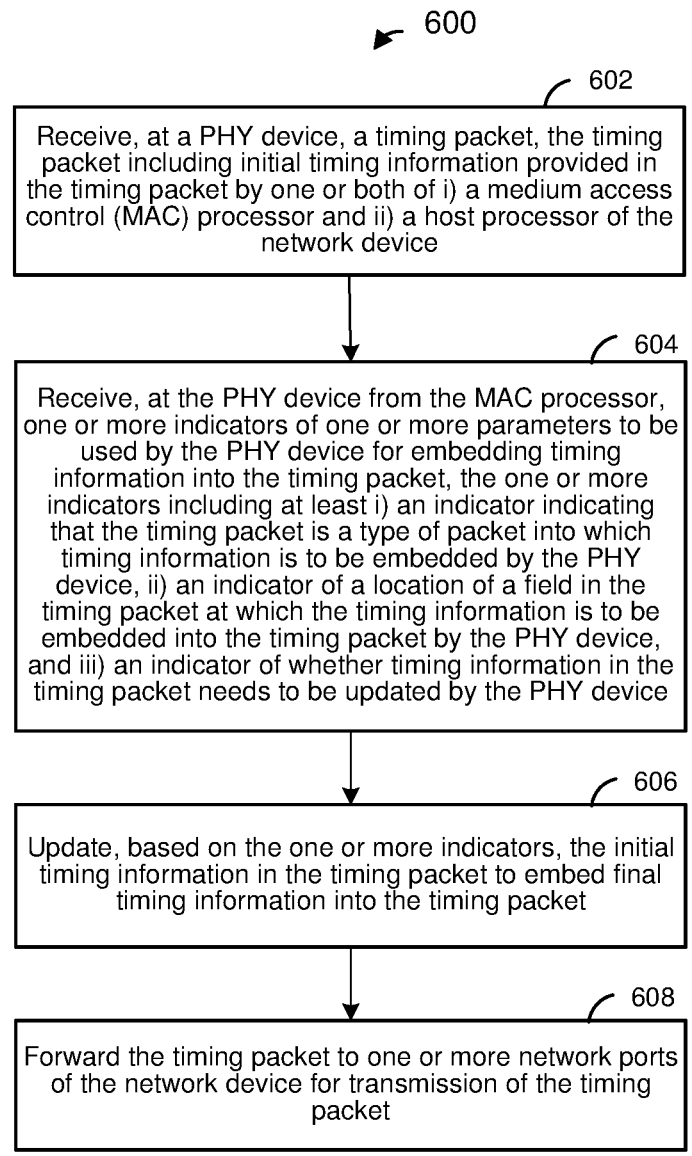
FIG. 6 is a flow diagram illustrating an example method for embedding timing information into timing packets to be transmitted by a network device, according to an embodiment.

FIG. 6 is a flow diagram illustrating an example method 600 for embedding timing information into timing packets to be transmitted by a network device, according to an embodiment. In an embodiment, the network device 100 of FIG. 1 implements the method 600. For example, in an embodiment, a PHY device 108 (e.g., the PHY device 108-2) of the network device 100 implements the method 600. For ease of explanation, the method 600 is described with reference to the network device 100 of FIG. 1. In other embodiments, the method 600 is implemented by other suitable network devices.

At block 602, a timing packet is received by a PHY device of the network device, the timing packet to be subsequently transmitted by the network device. In an embodiment, the timing packet is received at the PHY device from a MAC processor of the network device. In an embodiment, the timing packet includes initial timing information provided by one or both of i) the MAC processor and ii) a host processor of the network device.

At block 604, one or more indicators of one or more parameters to be used by the PHY device for embedding timing information into the timing packet are received at the PHY device. In an embodiment, the one or more indicators include at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device. In other embodiments, the one or more indicators additionally or alternatively include one or more other indicators of relevant information to enable the PHY device to efficiently embed timing information into the timing packet on-the-fly as the timing packet is transmitted from the network device. In an embodiment, control header (e.g., the control header 350 of FIG. 3B) is received by the PHY device from the MAC processor, the control header including the one or more indicators provided to the PHY device by the MAC processor. In other embodiments, the one or more indicators of the one or more parameters are received by the PHY device in other suitable manners, such as via control signals or one or more tags provided by the MAC processor to the PHY device separate from the timing packet being provided to the MAC processor to the PHY device.

At block updating 606, the initial timing information in the timing packet is updated, by the PHY device, to embed final timing information into the timing packet. For example, receiving the timing packet at block 602 comprises receiving a timing packet that includes i) a timestamp and ii) an initial correction field value generated based on a clock maintained by a host processor of the network device, and updating the timing information in the timing packet comprises updating the initial correction field value in the timing packet based on a clock maintained by the PHY device. In an embodiment, the timing information is updated by the PHY device based on the one or more indicators received at block 604 from the MAC processor by the PHY device. For example, in an embodiment, the PHY device updates the initial value of the correction field based on an indicator of a location of the correction field received from the MAC processor at block 604, and without parsing the timing packet to determine the location of the correction field in the timing packet. As another example, the PHY device determines whether a checksum trailer field is present in the timing packet based on an indicator provided by the MAC processor, and updates the checksum trailer field if the checksum trailer field is present in the timing packet.

At block 608, the timing packet is forwarded by the PHY device to one or more network ports of the network device for transmission from the network device to one or more other devices on the network to allow the one or more other network devices to synchronize with a master clock in the network.

Updating timing information in the timing packet by the PHY device based on one more indicators received at the PHY device from the MAC processor enables the PHY device to quickly and efficiently embed timing information into the packet by updating the initial value of the timing field of the timing packet without parsing the timing packet to determine location of the correction field in the timing packet and/or to determine whether a checksum trailer field is present in the timing packet, in various embodiments. Thus, in at least some embodiments, the PHY device is implemented with reduced hardware, which reduces power consumption, cost, etc., as compared to systems that in which a PHY device is configured to perform on-the-fly one-step timestamping without such indicators being provided from a MAC processor to the PHY device and/or without initial timing information being embedded into the timing packets by the MAC processor or by the host processor.

In an embodiment, a method for processing timing packets for synchronizing network devices in a network device comprises: receiving, at a media access control (MAC) processor of the network device, a timing packet to be transmitted by the network device; performing initial processing of the timing packet by the MAC processor, including generating one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and transferring i) the timing packet and ii) the one or more indicators from the MAC processor to the PHY device for further processing of the timing packet based on the one or more indicators and subsequent transmission of the timing packet from the network device.

In other embodiments, the method includes any suitable combination of one or more of the following features.

The method further comprises generating, by the MAC processor, a control header to include the one or more indicators generated for the timing packet, and inserting, by the MAC processor, the control header into the timing packet prior to transferring the timing packet to the PHY device.

The method further comprises generating, by the MAC processor, a PHY tag to be included in the control header, generating, by the MAC processor, the control header to include a PHY tag in an extension field of the control header, and inserting the control header at a predetermined location within the timing packet prior to transferring the timing packet to the PHY device.

Inserting the control header at the predetermined location in the timing packet comprises replacing, with the control header, a preamble at a beginning of the timing packet.

Generating the PHY tag includes generating the PHY tag to include one or more of i) an offset indicator field set to indicate an offset of a correction field in the timing packet relative to a delimiter field of the timing packet, ii) a checksum update indicator field set to indicate whether a checksum update is needed for the timing packet, and iii) a timestamp least significant bit (LSB) field, wherein the timestamp LSB field indicates to the PHY device whether a wraparound of a correction field value is to be accounted for by the PHY device.

Receiving the timing packet comprises receiving one of i) a timing packet generated by a host processor of the network device or ii) receiving a timing packet previously received by the network device, the timing packet previously received by the network device including a correction field for indicating a residence time of the timing packet in the network device.

The timing information to be embedded into the timing packet indicates one of i) a time corresponding to transmission of the timing packet from the network device or ii) a residence time of the timing packet in the network device.

In another embodiment, a network device configured to operate in a network comprises a media access control (MAC) processor configured to: receive a timing packet to be transmitted by the network device; generate one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and transfer i) the timing packet and ii) the one or more indicators to the PHY device for further processing of the timing packet based on the one or more indicators and subsequent transmission of the timing packet from the network device.

In other embodiments, the network device comprises any suitable combination of one or more of the following features.

The MAC processor is further configured to generate a control header to include the one or more indicators, and insert the control header into the timing packet prior to transferring the timing packet to the PHY device.

The MAC processor is further configured to generate a PHY tag to be included in the control header, generate the control header to include the PHY tag in an extension field of the control header, and insert the control header at a predetermined location within the timing packet prior to transferring the timing packet to the PHY device.

The MAC processor is configured to replace, with the control header, a preamble at a beginning of the timing packet.

The MAC processor is configured to generate the PHY tag to include one or more of i) an offset indicator field set to indicate an offset of a correction field in the timing packet relative to a delimiter field of the timing packet, ii) a checksum update indicator field set to indicate whether a checksum update is needed for the timing packet, and iii) a timestamp least significant bit (LSB) field, wherein the timestamp LSB field is set to indicate to the PHY device whether a wraparound of a correction field value is to be accounted for by the PHY device.

The timing packet is one of i) a timing packet generated by a host processor of the network device or ii) receiving a timing packet previously received by the network device, the timing packet previously received by the network device including a correction field for indicating a residence time of the timing packet in the network device.

The timing information to be embedded in the timing packet indicates one of i) a time corresponding to transmission of the timing packet from the network device or ii) a residence time of the timing packet in the network device.

In yet another embodiment, a network device configured to operate in a network comprises a media access control (MAC) processor coupled to a physical layer (PHY) device, wherein the MAC processor is configured to: receive a timing packet to be transmitted by the network device; generate one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and transfer i) the timing packet and ii) the one or more indicators to the PHY device. The PHY device is configured to: receive i) the timing packet from the MAC processor and ii) the one or more indicators from the MAC processor; embed, based on the one or more indicators, timing information into the timing packet; and forward the timing packet to one or more network ports of the network device for transmission of the timing packet from the network device.

In other embodiments, the network device comprises any suitable combination of one or more of the following features.

The timing packet is one of i) a timing packet generated by a host processor of the network device or ii) a timing packet previously received by the network device, the timing packet previously received by the network device including a correction field for indicating a residence time of the timing packet in the network device.

The timing information to be embedded in the timing packet indicates one of i) a time corresponding to transmission of the timing packet from the network device or ii) a residence time of the timing packet in the network device.

The MAC processor is configured to receive a timing packet that includes i) a timestamp and ii) a value of a correction field generated based on a clock maintained by a host processor of the network device.

The PHY device is configured to embed the timing information into the timing packet at least by updating the value of the correction field based on a clock maintained by the PHY device of the network device.

The MAC processor is configured to generate a PHY tag to include an offset indicator field set to indicate an offset of a correction field in the timing packet relative to a delimiter field of the timing packet, generate a control header to include the PHY tag in an extension field of the control header, and replace, with the control header, a preamble at a beginning of the timing packet prior to transferring the timing packet to the PHY device.

The PHY device is configured to update the correction field at the offset indicated by the offset indicator field and without parsing the timing packet to locate the correction field within the timing packet.

The MAC processor is configured to generate the PHY tag to further include a checksum update indicator field set to indicate whether a checksum update is needed for the timing packet.

The PHY device is configured to determine, based on the checksum update indicator field, whether a checksum update is needed for the timing packet, and in response to determining that a checksum update is needed for the timing packet, perform an incremental update of a checksum trailer field in the timing packet.

The MAC processor is configured to generate the PHY tag to further include a timestamp least significant bit (LSB) field, wherein the timestamp LSP field indicates whether a wraparound of a correction field value is to be accounted for by the PHY device.

The PHY device is configured to determine, based on the timestamp LSB field, whether wraparound of the correction field value is to be accounted for by the PHY device, and in response to determining that wraparound of the correction field value is to be accounted for by the PHY device, update the correction field to account for wraparound in the correction field.

In still another embodiment, a method for embedding timing information into timing packets to be transmitted by a network device comprises: receiving, at a physical layer (PHY) device of the network device, a timing packet to be transmitted by the network device, the timing packet including initial timing information provided by one or both of i) a medium access control (MAC) processor and ii) a host processor of the network device; receiving, at the PHY device from the MAC processor, one or more indicators of one or more parameters to be used by the PHY device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; updating, by the PHY device based on the one or more indicators, the initial timing information in the timing packet to embed final timing information into the timing packet; and forwarding, by the PHY device, the timing packet to one or more network ports of the network device for transmission of the timing packet from the network device.

In other embodiments, the method includes any suitable combination of one or more of the following features.

Receiving the one or more indicators comprises receiving a control header inserted into the timing packet by the MAC processor, wherein the control header includes the one or more indicators, and Updating the timing information in the timing packet comprises updating the timing information based on the one or more indicators included in the control header and without classifying the timing packet as a timing packet by the PHY device.

Receiving the timing packet comprises receiving a timing packet that includes i) a timestamp and ii) a correction field value generated based on a clock maintained by a host processor of the network device.

Updating the timing information in the timing packet comprises updating the correction field value in the timing packet based on a clock maintained by the PHY device.

Receiving the timing packet comprises receiving one of i) a timing packet generated by a host processor of the network device or ii) receiving a timing packet previously received by the network device, the timing packet previously received by the network device including a correction field for indicating a residence time of the timing packet in the network device.

Updating the initial timing information in the timing packet to embed final timing information into the timing packet comprises updating initial timing information that indicates one of i) a time corresponding to transmission of the timing packet from the network device or ii) a residence time of the timing packet in the network device.

Receiving the one or more indicators comprises receiving a PHY tag included in a control header at a predetermined location within the timing packet, and the method further comprises retrieving, by the PHY device, the PHY tag from the control header at the predetermined location within the timing packet the PHY device.

Retrieving the PHY tag comprises retrieving the PHY tag from the control header that replaces a preamble of at a beginning of the timing packet.

The PHY tag includes an offset indicator field set to indicate an offset of a correction field in the timing packet relative to a delimiter field of the timing packet, and Updating the initial timing information in the timing packet to embed the final timing information includes updating the correction field at the offset indicated by the offset indicator field and without parsing the timing packet by the PHY device to locate the correction field within the timing packet.

The PHY further includes a checksum update indicator field set to indicate whether a checksum update is needed for the timing packet.

Updating the initial timing information in the timing packet to embed the final timing information includes determining, based on the checksum update indicator field, whether a checksum update is needed for the timing packet, and in response to determining that a checksum update is needed for the timing packet, performing an incremental update of a checksum trailer field in the timing packet.

The PHY further includes a timestamp least significant bit (LSB) field, wherein the timestamp LSB indicates whether a wraparound of a correction field value is to be accounted for by the PHY device.

Updating the initial timing information in the timing packet to embed the final timing information includes determining, based on the timestamp LSB field, whether wraparound of the correction field value is to be accounted for by the PHY device, and in response to determining that wraparound of the correction field value is to be accounted for by the PHY device, updating the correction field to account for wraparound in the correction field.

In yet another embodiment, a network device configured to operate in a network comprises a physical layer (PHY) device processor configured to: receive a timing packet to be transmitted by the network device, the timing packet including initial timing information provided by one or both of i) a medium access control (MAC) processor and ii) a host processor of the network device; receive one or more indicators of one or more parameters to be used by the PHY device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; update, based on the one or more indicators, the initial timing information in the timing packet to embed final timing information into the timing packet; and forwarding the timing packet to one or more network ports of the network device for transmission of the timing packet from the network device.

In other embodiments, the network device comprises any suitable combination of one or more of the following features.

The PHY device is configured to receive a timing packet that includes i) a timestamp and ii) a correction field value generated based on a clock maintained by a host processor of the network device, and update the correction field value in the timing packet based on a clock maintained by the PHY device.

The PHY device is configured to receive one of i) a timing packet generated by a host processor of the network device or ii) receiving a timing packet previously received by the network device, the timing packet previously received by the network device including a correction field for indicating a residence time of the timing packet in the network device.

The PHY device is configured to update the initial timing information in the timing packet to embed final timing information into the timing packet at least by updating initial timing information that indicates one of i) a time corresponding to transmission of the timing packet from the network device or ii) a residence time of the timing packet in the network device.

The PHY device is configured to receive, from the MAC processor, a control header inserted into the timing packet by the MAC processor, wherein the control header includes the one or more indicators, and update the timing information based on the one or more indicators in the control header and without classifying the timing packet as a timing packet by the PHY device.

The control header i) is inserted into the timing packet at a predetermined location within the timing packet and ii) includes a PHY tag in an extension field of the control header, and the PHY device is configured to retrieve the PHY tag from the control header at the predetermined location within the timing packet the PHY device.

The PHY device is configured to retrieve the PHY tag from the control header that replaces a preamble of at a beginning of the timing packet.

The PHY tag includes an offset indicator field set to indicate an offset of a correction field in the timing packet relative to a delimiter field of the timing packet, and the PHY device is configured to update the correction field at the offset indicated by the offset indicator field and without parsing the timing packet to locate the correction field within the timing packet.

The PHY tag further includes a checksum update indicator field set to indicate whether a checksum update is needed for the timing packet, and the PHY device is configured to determine, based on the checksum update indicator field, whether a checksum update is needed for the timing packet, and in response to determining that a checksum update is needed for the timing packet, perform an incremental update of a checksum trailer field in the timing packet.

The PHY tag further includes a timestamp least significant bit (LSB) field, wherein the timestamp LSB indicates whether a wraparound of a correction field value is to be accounted for by the PHY device, and the PHY device is configured to determine, based on the timestamp LSB field, whether wraparound of the correction field value is to be accounted for by the PHY device, and in response to determining that wraparound of the correction field value is to be accounted for by the PHY device, update the correction field to account for wraparound in the correction field.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing timing packets for synchronizing network devices in a network device, the method comprising:

receiving, at a media access control (MAC) processor of the network device, a timing packet to be transmitted by the network device;

performing initial processing of the timing packet by the MAC processor, including generating one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and transferring i) the timing packet and ii) the one or more indicators from the MAC processor to the PHY device for further processing of the timing packet based on the one or more indicators and subsequent transmission of the timing packet from the network device.

2. The method of claim 1, further comprising generating, by the MAC processor, a control header to include the one or more indicators generated for the timing packet, and inserting, by the MAC processor, the control header into the timing packet prior to transferring the timing packet to the PHY device.

3. The method of claim 2, further comprising generating, by the MAC processor, a PHY tag to be included in the control header, generating, by the MAC processor, the control header to include a PHY tag in an extension field of the control header, and inserting the control header at a predetermined location within the timing packet prior to transferring the timing packet to the PHY device.

4. The method of claim 3, wherein inserting the control header at the predetermined location in the timing packet comprises replacing, with the control header, a preamble at a beginning of the timing packet.

5. The method of claim 4, wherein generating the PHY tag includes generating the PHY tag to include one or more of i) an offset indicator field set to indicate an offset of a correction field in the timing packet relative to a delimiter field of the timing packet, ii) a checksum update indicator field set to indicate whether a checksum update is needed for the timing packet, and iii) a timestamp least significant bit (LSB) field, wherein the timestamp LSB field indicates to the PHY device whether a wraparound of a correction field value is to be accounted for by the PHY device.

6. The method of claim 1, wherein receiving the timing packet comprises receiving one of i) a timing packet generated by a host processor of the network device or ii) receiving a timing packet previously received by the network device, the timing packet previously received by the network device including a correction field for indicating a residence time of the timing packet in the network device, and wherein the timing information to be embedded into the timing packet indicates one of i) a time corresponding to transmission of the timing packet from the network device or ii) a residence time of the timing packet in the network device.

7. A network device configured to operate in a network, the network device comprising:
a media access control (MAC) processor configured to
receive a timing packet to be transmitted by the network device,
generate one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and
transfer i) the timing packet and ii) the one or more indicators to the PHY device for further processing of the timing packet based on the one or more indicators and subsequent transmission of the timing packet from the network device.

8. The network device of claim 7, wherein the MAC processor is further configured to
generate a control header to include the one or more indicators, and
insert the control header into the timing packet prior to transferring the timing packet to the PHY device.

9. The network device of claim 8, wherein the MAC processor is further configured to
generate a PHY tag to be included in the control header,
generate the control header to include the PHY tag in an extension field of the control header, and
insert the control header at a predetermined location within the timing packet prior to transferring the timing packet to the PHY device.

10. The network device of claim 9, wherein the MAC processor is configured to replace, with the control header, a preamble at a beginning of the timing packet.

11. The network device of claim 8, wherein the MAC processor is configured to generate the PHY tag to include one or more of i) an offset indicator field set to indicate an offset of a correction field in the timing packet relative to a delimiter field of the timing packet, ii) a checksum update indicator field set to indicate whether a checksum update is needed for the timing packet, and iii) a timestamp least significant bit (LSB) field, wherein the timestamp LSB field is set to indicate to the PHY device whether a wraparound of a correction field value is to be accounted for by the PHY device.

12. The network device of claim 7, wherein
the timing packet is one of i) a timing packet generated by a host processor of the network device or ii) receiving a timing packet previously received by the network device, the timing packet previously received by the network device including a correction field for indicating a residence time of the timing packet in the network device.

13. The network device of claim 7, wherein the timing information to be embedded in the timing packet indicates one of i) a time corresponding to transmission of the timing packet from the network device or ii) a residence time of the timing packet in the network device.

14. A network device configured to operate in a network, the network device comprising:
a media access control (MAC) processor coupled to a physical layer (PHY) device, wherein the MAC processor is configured to
receive a timing packet to be transmitted by the network device,
generate one or more indicators of one or more parameters to be used by a PHY device of the network device for embedding timing information into the timing packet, the one or more indicators including at least i) an indicator indicating that the timing packet is a type of packet into which timing information is to be embedded by the PHY device, ii) an indicator of a location of a field in the timing packet at which the timing information is to be embedded into the timing packet by the PHY device, and iii) an indicator of whether timing information in the timing packet needs to be updated by the PHY device; and
transfer i) the timing packet and ii) the one or more indicators to the PHY device; wherein
the PHY device is configured to
receive i) the timing packet from the MAC processor and ii) the one or more indicators from the MAC processor;
embed, based on the one or more indicators, timing information into the timing packet; and
forward the timing packet to one or more network ports of the network device for transmission of the timing packet from the network device.

15. The network device of claim 14, wherein
the timing packet is one of i) a timing packet generated by a host processor of the network device or ii) a timing packet previously received by the network device, the timing packet previously received by the network device including a correction field for indicating a residence time of the timing packet in the network device, and
the timing information to be embedded in the timing packet indicates one of i) a time corresponding to transmission of the timing packet from the network device or ii) a residence time of the timing packet in the network device.

16. The network device of claim 14, wherein
the MAC processor is configured to receive a timing packet that includes i) a timestamp and ii) a value of a correction field generated based on a clock maintained by a host processor of the network device, and
the PHY device is configured to embed the timing information into the timing packet at least by updating the value of the correction field based on a clock maintained by the PHY device of the network device.

17. The network device of claim 16, wherein
the MAC processor is configured to
generate a PHY tag to include an offset indicator field set to indicate an offset of a correction field in the timing packet relative to a delimiter field of the timing packet,
generate a control header to include the PHY tag in an extension field of the control header, and
replace, with the control header, a preamble at a beginning of the timing packet prior to transferring the timing packet to the PHY device, and
the PHY device is configured to update the correction field at the offset indicated by the offset indicator field and without parsing the timing packet to locate the correction field within the timing packet.

18. The network device of claim 17, wherein
the MAC processor is configured to generate the PHY tag
to further include a checksum update indicator field set
to indicate whether a checksum update is needed for the
timing packet, and the PHY device is configured to
determine, based on the checksum update indicator field, whether a checksum update is needed for the timing packet, and
in response to determining that a checksum update is needed for the timing packet, perform an incremental update of a checksum trailer field in the timing packet.

19. The network device of claim 17, wherein
the MAC processor is configured to generate the PHY tag to further include a timestamp least significant bit (LSB) field, wherein the timestamp LSP field indicates whether a wraparound of a correction field value is to be accounted for by the PHY device, and the PHY device is configured to
determine, based on the timestamp LSB field, whether wraparound of the correction field value is to be accounted for by the PHY device, and
in response to determining that wraparound of the correction field value is to be accounted for by the PHY device, update the correction field to account for wraparound in the correction field.

\* \* \* \* \*